US012577679B2

(12) United States Patent     (10) Patent No.:   US 12,577,679 B2

Beck et al.     (45) Date of Patent:    Mar. 17, 2026

(54) ALUMINUM ALLOY ARTICLES EXHIBITING IMPROVED BOND DURABILITY AND METHODS OF MAKING THE SAME

(71) Applicant: Novelis Inc., Atlanta, GA (US)

(72) Inventors: Emanuel Beck, Miege (CH); Alexandre Durussel, Chavannes-près-Renens (CH); Xavier Varone, Champlan (CH); Mario A. Salgado-Ordorica, Sion (CH); Joerg Simon, Varen (CH); Guillaume Florey, Veyras (CH); Michele Edith Berner, Sion (CH); Corrado Bassi, Salgesch (CH); Cyrille Bezencon, Chermignon d'en-bas (CH); Mathilde Guerin, Sierre (CH); Alejandro Puig, Sierre (CH)

(73) Assignee: Novelis Inc., Atlanta, GA (US)

( * ) Notice: Subject to any disclaimer, the term of this patent is extended or adjusted under 35 U.S.C. 154(b) by 16 days.

(21) Appl. No.: 17/908,765

(22) PCT Filed: Mar. 17, 2021

(86) PCT No.: PCT/US2021/022665

§ 371 (c)(1),
(2) Date: Sep. 1, 2022

(87) PCT Pub. No.: WO2021/188610

PCT Pub. Date: Sep. 23, 2021

(65) Prior Publication Data

US 2023/0118694 A1     Apr. 20, 2023

Related U.S. Application Data

(60) Provisional application No. 62/991,317, filed on Mar. 18, 2020.

(51) Int. Cl.
*C23C 22/83*     (2006.01)
*B32B 15/04*     (2006.01)
(Continued)

(52) U.S. Cl.
CPC ............ *C23C 22/83* (2013.01); *B32B 15/043* (2013.01); *B32B 15/20* (2013.01); *C09J 5/02* (2013.01);
(Continued)

(58) Field of Classification Search
CPC ... B32B 15/043; B32B 15/20; B32B 2311/24; B32B 2605/12; B32B 2605/18;
(Continued)

(56) References Cited

U.S. PATENT DOCUMENTS

2017/0066220 A1*   3/2017   Tatsumi ................... B32B 7/12
2017/0334171 A1*   11/2017   Takada ................... B32B 27/36
2019/0032225 A1*   1/2019   Bassi ..................... C23C 22/56

FOREIGN PATENT DOCUMENTS

CN     106029950 A    10/2016
CN     107075691 A    8/2017
(Continued)

OTHER PUBLICATIONS

Web Archive of "Overview of materials for 6000 Series Aluminum Alloy", MatWeb, Aug. 14, 2016 (MatWeb), https://web.archive.org/web/20160814004522/https://www.matweb.com/search/datasheet.aspx?MatGUID=26d19f2d20654a489aefc0d9c247cebf&ckck=1 (Year: 2016).*

(Continued)

*Primary Examiner* — Daniel J. Schleis

(74) *Attorney, Agent, or Firm* — Kilpatrick Townsend & Stockton LLP

(57) ABSTRACT

Disclosed are metal articles and methods of making and processing such metal articles. More particularly, disclosed
(Continued)

are aluminum alloy articles exhibiting controllable surface properties, including excellent bond durability. An aluminum alloy article as described herein includes a surface having a concentration of an alloying element, and a coating having a concentration of an element capable of interacting with the alloying element. Also disclosed herein are methods of providing metal articles having excellent bond durability.

3 Claims, 5 Drawing Sheets

(51) Int. Cl.

| | | |
|---|---|---|
| *B32B 15/20* | (2006.01) | |
| *C09J 5/02* | (2006.01) | |
| *C22C 21/02* | (2006.01) | |
| *C23C 22/56* | (2006.01) | |
| *C23G 1/12* | (2006.01) | |

(52) U.S. Cl.
CPC .............. *C22C 21/02* (2013.01); *C23C 22/56* (2013.01); *C23G 1/125* (2013.01); *B32B 2311/24* (2013.01); *B32B 2605/08* (2013.01); *B32B 2605/12* (2013.01); *B32B 2605/18* (2013.01); *C09J 2203/354* (2020.08); *C09J 2301/504* (2020.08); *C09J 2400/163* (2013.01); *C09J 2400/166* (2013.01); *C23C 2222/20* (2013.01)

(58) Field of Classification Search
CPC .. C09J 5/02; C09J 2203/354; C09J 2301/504; C09J 2400/163; C09J 2400/166; C22C 21/00; C22C 21/02; C22C 21/56; C22C 21/83; C22C 2222/20; C23G 1/125
See application file for complete search history.

(56) References Cited

FOREIGN PATENT DOCUMENTS

| EP | 3109343 A1 | 12/2016 |
|---|---|---|
| EP | 3219828 A1 | 9/2017 |
| JP | 2015157967 A | 9/2015 |
| JP | 2017203185 A | 11/2017 |
| JP | 2018171749 † | 11/2018 |
| KR | 20170060103 A | 5/2017 |
| WO | 2017006804 A1 | 1/2017 |
| WO | 2017195806 A1 | 11/2017 |
| WO | 2019027822 A1 | 2/2019 |

OTHER PUBLICATIONS

Database WPI Week 201709 Jan. 12, 2017 (Jan. 12, 2017) Thomson Scientific, London, GB; AN 2017-031547 XP002803209.

Hatefi et al., "The Effect of Silane Layer Drying Temperature on Epoxy Coating Adhesion on Silane-Pretreated Aluminum Substrate", Journal of Coatings Technology and Research, vol. 10, Issue 5, Apr. 23, 2013, pp. 743-747.

Lung et al., "Resin Zirconia Bonding Promotion with Some Novel Coupling Agents", Dental Materials, vol. 28, Issue 8, Aug. 2012, pp. 863-872.

International Application No. PCT/US2021/022665 , "International Search Report and the Written Opinion", Jun. 18, 2021, 18 pages.

Chinese Application No. 202180022065.4 , "Office Action", Jan. 22, 2024, 25 pages.

Canadian Application No. 3,169,438 , "Office Action", Sep. 8, 2023, 4 pages.

Japanese Application No. 2022-556258 , "Office Action", Oct. 3, 2023, 14 pages.

Canadian Application No. 3,169,438 , "Notice of Allowance", Apr. 2, 2024, 1 page.

Japanese Application No. 2022556258 , "Office Action", Mar. 5, 2024, 11 pages.

Kitaoka et al., "Aluminum-Silicon alloys", Light Metal, vol. 38, No. 7, Jul. 1988, pp. 426-446.

Korean Application No. 10-2022-7027196 , "Office Action", Apr. 12, 2024, 12 pages.

CN Application No. 202180022065.4, "Office Action", Jul. 28, 2024, 24 pages.

Zhou et al., "Modern Aluminum Alloy Plates and Strips: Investment and Design, Technology and Equipment, Products and Markets", Metallurgical Industry Press, Apr. 30, 2012, 2 pages.

Chinese Application No. 202180022065.4 , Office Action, Mailed On Oct. 30, 2024, 21 pages.

Korean Application No. 10-2022-7027196 , Office Action, Mailed On Dec. 2, 2024, 8 pages.

Japanese Application No. 2022-556258, "Office Action", Sep. 2, 2025, 12 pages.

Korean Application No. 10-2022-7027196, "Notice of Decision to Grant", Aug. 25, 2025, 6 pages.

Janis G. Matisons, "Silanes and Siloxanes as Coupling Agents to Glass: A Perspective", in Silicone Surface Science, Michael J. Owen &Petar R. Dvornic eds., 2012, pp. 281-298.†

\* cited by examiner
† cited by third party

ALUMINUM ALLOY ARTICLES EXHIBITING IMPROVED BOND DURABILITY AND METHODS OF MAKING THE SAME

CROSS-REFERENCE TO RELATED APPLICATION

The present application claims priority to and filing benefit of U.S. Provisional Patent Application No. 62/991, 317, filed on Mar. 18, 2020, which is incorporated herein by reference in its entirety.

FIELD

The present disclosure is directed to aluminum alloy articles and the surface features of the same. The disclosure further relates to methods of pretreating aluminum alloy articles.

BACKGROUND

Aluminum alloy articles are often bonded or joined to other metals or alloys, including other aluminum alloys, during fabrication of aluminum alloy-based articles and other metal-based articles. Requirements of the articles include, for example, good bond durability and high resistance to harsh environmental conditions. Aluminum alloy articles can be pretreated to enhance the bond durability.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Provided herein are pretreated metal articles comprising a first surface portion comprising excess silicon (Si); and a surface pretreatment layer comprising one or more Si-containing compounds, wherein either one of the first surface portion or the one or more Si-containing compounds comprises oxygen (O), and wherein silicon-oxygen-silicon (Si—O—Si) bonding interactions exist between the excess Si present in the first surface portion and the one or more Si-containing compounds present in the surface pretreatment layer, and wherein the surface pretreatment layer is adhered to the first surface portion. In certain aspects, the excess Si is present in the first surface portion in an amount greater than about 1.4 wt. %.

Optionally, the pretreated metal article comprises aluminum or an aluminum alloy, steel, magnesium or a magnesium alloy, titanium or a titanium alloy, copper or a copper alloy, any suitable metal or metal alloy, or any combination thereof In some cases, the pretreated metal article comprises an aluminum alloy (e.g., a 4xxx series aluminum alloy, a 5xxx series aluminum alloy, or a 6xxx series aluminum alloy). In certain aspects, the Si-containing compound comprises a silicon-oxygen (SiO$_x$)-containing moiety, where x is an integer in a range of from 1 to 4 (e.g., 1, 2, 3, or 4). The pretreated metal article can optionally be an automotive structural part, an aerospace structural part, a transportation structural part, an automotive body part, an aerospace skin panel, a transportation body part, an architectural part, an aesthetic part, an electronics device housing, or a beverage or food container.

Also provided herein are methods of joining a first metal to a second metal, comprising providing a first metal having a first surface portion comprising excess Si; applying a surface pretreatment layer comprising one or more Si-containing compounds to the first surface portion of the first metal to form a pretreated surface portion of the first metal, wherein either one of the first surface portion of the first metal or the one or more Si-containing compounds comprises O, wherein the applying stimulates Si—O—Si bonding interactions between the excess Si present in the first surface portion of the first metal and the one or more Si-containing compounds present in the surface pretreatment layer; and joining the pretreated surface portion of the first metal to a surface of a second metal. In some cases, one or more of the following conditions (a)-(c) is achieved: (a) a bond durability between the pretreated surface portion of the first metal and the surface of the second metal is greater than a bond durability between (i) a surface portion of a metal comprising excess Si and pretreated with a surface pretreatment that does not contain one or more Si-containing compounds and (ii) a second metal; (b) a bond durability between the pretreated surface portion of the first metal and the surface of the second metal is greater than a bond durability between (i) a surface portion of a metal that does not comprise excess Si and is pretreated with a surface pretreatment that contains one or more Si-containing compounds and (ii) a second metal; or (c) a bond durability between the pretreated surface portion of the first metal and the surface of the second metal is greater than a bond durability between (i) a surface portion of a metal that does not comprise excess Si and is pretreated with a surface pretreatment that does not contain one or more Si-containing compounds and (ii) a second metal.

The first metal can optionally be aluminum or an aluminum alloy, steel, magnesium or a magnesium alloy, titanium or a titanium alloy, copper or a copper alloy, any suitable metal or metal alloy, or any combination thereof. Optionally, the first metal is an aluminum alloy. In certain aspects, the aluminum alloy can be a 4xxx series aluminum alloy, a 5xxx series aluminum alloy, or a 6xxx series aluminum alloy. Optionally, the second metal can be aluminum or an aluminum alloy, steel, magnesium or a magnesium alloy, titanium or a titanium alloy, copper or a copper alloy, any suitable metal or metal alloy, or any combination thereof. In some examples, the first surface portion of the first metal comprises excess Si in an amount greater than about 1.4 wt. %. The methods described herein can further include etching at least the first surface portion of the first metal prior to the applying step, wherein the etching at least the first surface portion of the metal can expose Si in the first surface portion by removing up to about 3 grams per square meter (g/m$^2$) of a surface material. The methods described herein can further include cleaning at least the first surface portion of the first metal prior to the applying. The cleaning of at least the first surface portion of the first metal can remove native oxide or hydroxide species from the first surface portion of the first metal. In some cases, applying the surface pretreatment layer to the first surface portion of the first metal comprises bar coating, roll coating, spray coating, or dip coating, and curing the surface pretreatment.

Further provided herein are joined metal structures prepared according to the methods described herein, wherein a bond strength of the joined metal structure experiences a bond strength loss of less than 40% after 20 weeks of exposure to a neutral salt spray test.

Further aspects, objects, and advantages will become apparent upon consideration of the detailed description and figures that follow.

DETAILED DESCRIPTION

Figure 1:
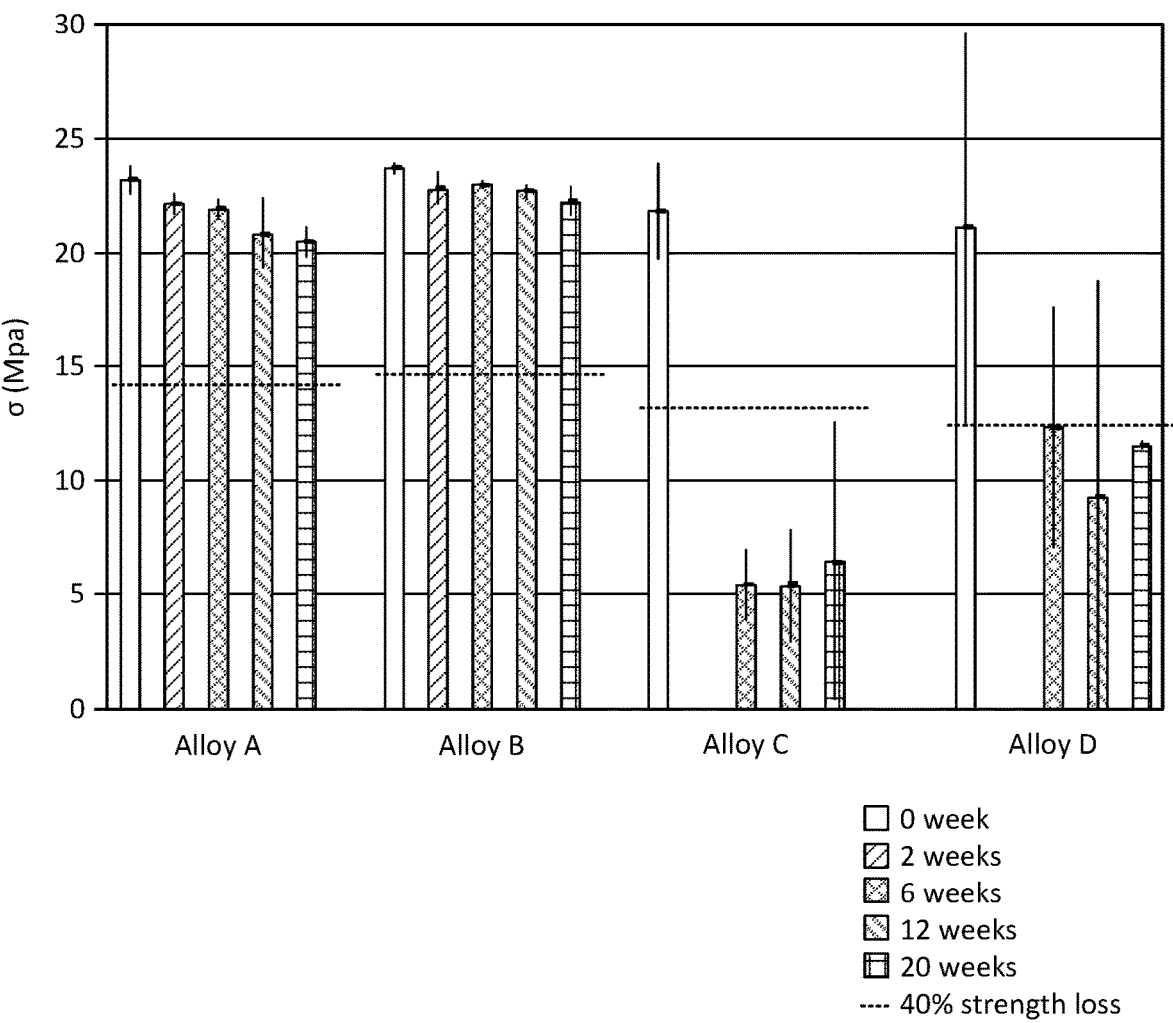
FIG. 1 is a graph showing initial bond strength and bond strength loss in megaPascals (MPa) at 0 weeks, 2 weeks, 6 weeks, 12 weeks, and 20 weeks for aluminum alloy samples tested in an adhesive bonding test.
Figures 2A, 2B, 2C, 2D, 2E:
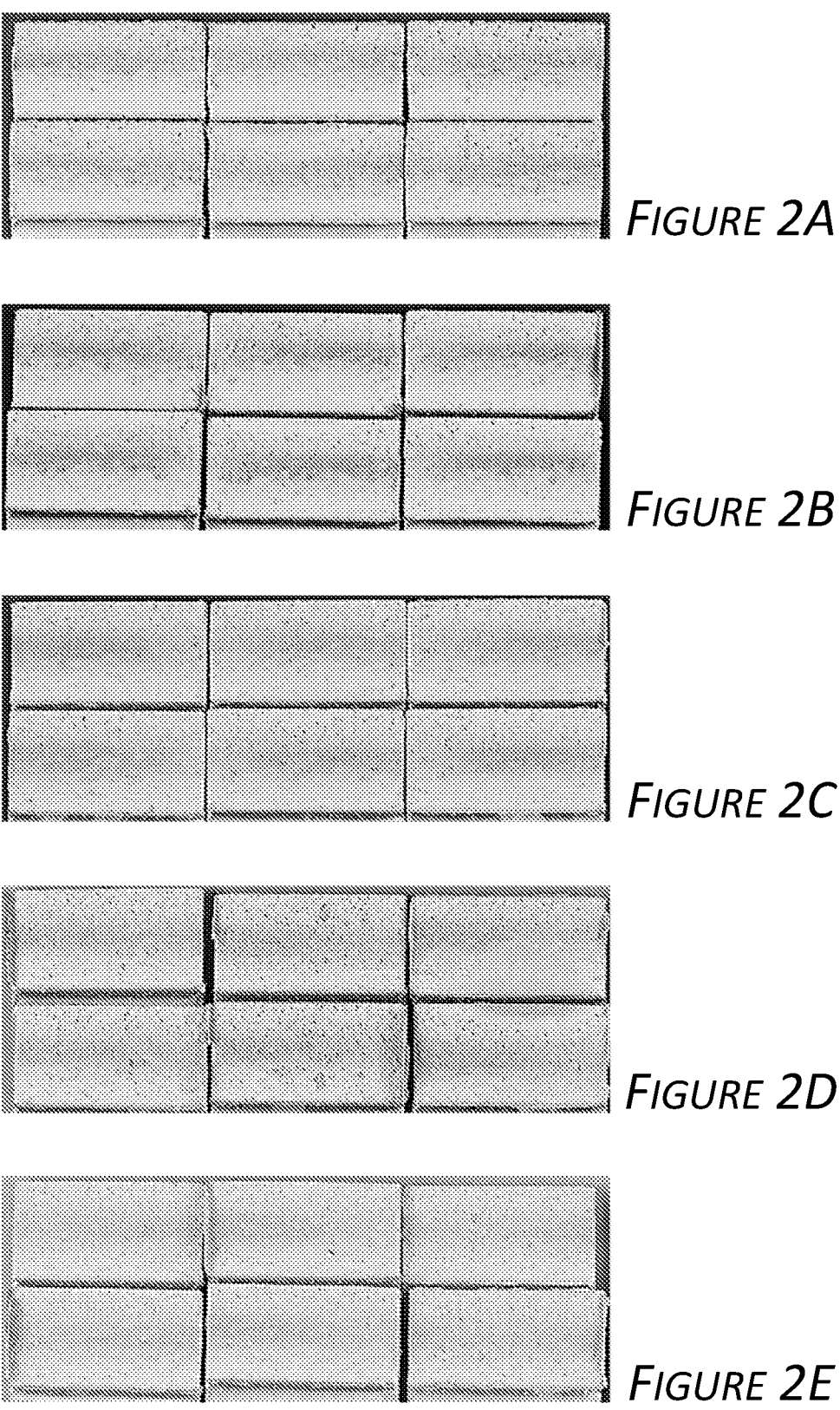
FIGS. 2A-2E are digital images of adhesive testing results for aluminum alloy samples containing excess Si and pretreated with a Si-containing compound at 0 weeks (FIG. 2A), 2 weeks (FIG. 2B), 6 weeks (FIG. 2C), 12 weeks (FIG. 2D), and 20 weeks (FIG. 2E).

Described herein are pretreated metal articles and methods of preparing joined metal articles, including aluminum alloy articles, having desired bond durability properties. In some non-limiting examples, the metal articles described herein have a concentration of alloying elements, such as Si, which occupies at least a portion of a surface of the metal article following a surface etching process, a surface cleaning process, a heat treatment process, a hot working process, a cold working process, a warm working process, any suitable metallurgic process that can instigate Si migration from a bulk of the metal to a surface of the metal, or any combination thereof In certain examples, the Si migration from the bulk of the metal to the surface of the metal increases the Si content at the surface of the metal by at least one order of magnitude. One or more surfaces of the metal article can be coated with a surface pretreatment layer that includes Si-containing compounds (e.g., Si-containing compounds containing $SiO_x$ moieties). In some cases, a concentration of Si across at least the portion of the surface of the metal article can provide desirable bond durability after applying a Si-based pretreatment layer to the surface of the metal article. The contact between the surface of the metal article and the pretreatment layer stimulates Si—O—Si bonding interactions between the Si-containing compounds within the surface of the metal article and the Si-containing compounds in the pretreatment layer. In some cases, Si within the surface of the metal article (e.g., excess Si in the metal article as described below) can interact with O atoms in the pretreatment layer (e.g., $SiO_x$ moieties) to provide the Si—O—Si interaction. For example, Si atoms within the surface of the metal article can interact with $SiO_x$ moieties in the pretreatment layer. In certain cases, the Si—O—Si bonding interactions arise from the Si content at the surface of the metal (e.g., excess Si in the metal article as described below), metal oxides at the surface of the metal (e.g., aluminum oxide ($Al_2O_3$)), and the Si-containing compounds in the pretreatment layer. In some examples, excess Si within the surface of the metal article can interact with O atoms within the surface of the metal article (e.g., $Al_2O_3$) and/or O atoms in the pretreatment layer (e.g., $SiO_x$ moieties) to provide the Si—O—Si interaction. In other aspects, excess Si within the surface of the metal article can interact with O atoms within the surface of the metal article (e.g., metal oxides (e.g., $Al_2O_3$), O atoms in the metal lattice, excess Si that has at least partially oxidized, O present in Si-containing compounds within the alloy, other O-containing compounds in the alloy, other or the like) and Si atoms in the pretreatment layer (e.g., Si atoms or $SiO_x$ moieties) to provide the Si—O—Si interaction.

Definitions and Descriptions

The terms "invention,""the invention,""this invention"and "the present invention"used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series"or "AA4xxx."For an understanding of the number designation system most commonly used in naming and identifying aluminum and its alloys, see "International Alloy Designations and Chemical Composition Limits for Wrought Aluminum and Wrought Aluminum Alloys"or "Registration Record of Aluminum Association Alloy Designations and Chemical Compositions Limits for Aluminum Alloys in the Form of Castings and Ingot,"both published by The Aluminum Association.

As used herein, the meaning of "a,""an,"or "the"includes singular and plural references unless the context clearly dictates otherwise.

As used herein, a plate generally has a thickness of greater than about 15 mm. For example, a plate may refer to an aluminum article having a thickness of greater than 15 mm, greater than 20 mm, greater than 25 mm, greater than 30 mm, greater than 35 mm, greater than 40 mm, greater than 45 mm, greater than 50 mm, or greater than 100 mm.

As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm.

As used herein, a sheet generally refers to an aluminum article having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

Reference is made in this application to alloy condition or temper. For an understanding of the alloy temper descriptions most commonly used, see "American National Standards (ANSI) H35 on Alloy and Temper Designation Systems."An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked.

As used herein, terms such as "cast metal article,""cast article,"and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, "bond durability"refers to an ability of a bonding agent bonding two articles together to withstand cycled mechanical stress after exposure to environmental conditions that initiate failure of the bonding agent. Bond durability is characterized in terms of number of mechanical stress cycles applied to the bound articles until the bond fails.

As used herein, "room temperature"can include a temperature of from about 15°C. to about 30°C., for example about 15°C., about 16°C., about 17°C., about 18°C., about 19°C., about 20°C., about 21°C., about 22°C., about 23°C., about 24°C., about 25°C., about 26°C., about 27°C., about 28°C., about 29°C., or about 30°C.

All ranges disclosed herein are to be understood to encompass both endpoints and any and all subranges subsumed therein. For example, a stated range of "1 to 10"should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Metal Articles

Described herein are metal articles having desired surface properties, including bond durability. The metal articles can include Si as a predominant alloying element and include at least one surface or a portion thereof that is coated with a surface pretreatment comprising one or more Si-containing compounds (e.g., Si-containing compounds containing $SiO_x$ moieties). In certain aspects, the metal articles can be aluminum alloy articles having one or more surfaces that contain excess Si (e.g., the excess Si is present in an amount greater than about 1.4 wt. %.). In some cases, the excess Si in the aluminum alloy surface interacts with the one or more $SiO_x$ moieties in the pretreatment. In some cases, the excess Si in the aluminum alloy surface is oxidized to form silicon dioxide, and the silicon dioxide present in the aluminum alloy surface interacts with the one or more Si-containing compounds in the pretreatment. The Si—O—Si bonding interactions provide increased bond durability when the metal article is bonded to at least a second metal article.

Not to be bound by theory, a pretreatment can be coupled to the metal article using mechanical bonding, van der Waals forces, dipole interactions, hydrogen bonding, covalent bonding, ionic bonding, or any suitable mechanism initiated by intimate contact between the pretreatment and the metal article. In certain non-limiting examples, excess Si in the aluminum alloy articles, including excess Si at the aluminum alloy surface, can covalently bond to $SiO_x$ moieties in the pretreatment. The adhesion of the pretreatment to the metal article is enhanced by exploiting Sis ability to form Si—O—Si bonds. Thus, applying a pretreatment including a Si-containing compound (e.g., a $SiO_x$ moieties) to a metal article having excess Si enhances pretreatment adhesion via the Si—O—Si bonding interactions described above.

As used herein, the term "surface"refers to the portion of the metal article that extends from the exterior face of the metal article into an interior of the metal article to a depth of up to about 5 μm, (e.g., up to about 0.1 μm, up to about 0.2 μm, up to about 0.3 μm, up to about 0.4 μm, up to about 0.5 μm, up to about 0.6 μm, up to about 0.7 μm, up to about 0.8 μm, up to about 0.9 μm, up to about 1 μm, up to about 2 μm, up to about 3 μm, up to about 4 μm, or up to about 4.5 μm).

Optionally, the surface refers to the portion of the metal article that extends into the interior of the metal article to a depth of about 0.01 μm, about 0.02 μm, about 0.03 μm, about 0.04 μm, about 0.05 μm, about 0.06 μm, about 0.07 μm, about 0.08 μm, about 0.09 μm, about 0.1 μm, about 0.11 μm, about 0.12 μm, about 0.13 μm, about 0.14 μm, about 0.15 μm, about 0.16 μm, about 0.17 μm, about 0.18 μm, about 0.19 μm, about 0.2 μm, about 0.21 μm, about 0.22 μm, about 0.23 μm, about 0.24 μm, about 0.25 μm, about 0.26 μm, about 0.27 μm, about 0.28 μm, about 0.29 μm, about 0.3 μm, about 0.31 μm, about 0.32 μm, about 0.33 μm, about 0.34 μm, about 0.35 μm, about 0.36 μm, about 0.37 μm, about 0.38 μm, about 0.39 μm, about 0.4 μm, about 0.41 μm, about 0.42 μm, about 0.43 μm, about 0.44 μm, about 0.45 μm, about 0.46 μm, about 0.47 μm, about 0.48 μm, about 0.49 μm, about 0.5 μm, about 0.51 μm, about 0.52 μm, about 0.53 μm, about 0.54 μm, about 0.55 μm, about 0.56 μm, about 0.57 μm, about 0.58 μm, about 0.59 μm, about 0.6 μm, about 0.61 μm, about 0.62 μm, about 0.63 μm, about 0.64 μm, about 0.65 μm, about 0.66 μm, about 0.67 μm, about 0.68 μm, about 0.69 μm, about 0.7 μm, about 0.71 μm, about 0.72 μm, about 0.73 μm, about 0.74 μm, about 0.75 μm, about 0.76 μm, about 0.77 μm, about 0.78 μm, about 0.79 μm, about 0.8 μm, about 0.81 μm, about 0.82 μm, about 0.83 μm, about 0.84 μm, about 0.85 μm, about 0.86 μm, about 0.87 μm, about 0.88 μm, about 0.89 μm, about 0.9 μm, about 0.91 μm, about 0.92 μm, about 0.93 μm, about 0.94 μm, about 0.95 μm, about 0.96 μm, about 0.97 μm, about 0.98 μm, about 0.99 μm, about 1 μm, about 1.01 μm, about 1.02 μm, about 1.03 μm, about 1.04 μm, about 1.05 μm, about 1.06 μm, about 1.07 μm, about 1.08 μm, about 1.09 μm, about 1.1 μm, about 1.11 μm, about 1.12 μm, about 1.13 μm, about 1.14 μm, about 1.15 μm, about 1.16 μm, about 1.17 μm, about 1.18 μm, about 1.19 μm, about 1.2 μm, about 1.21 μm, about 1.22 μm, about 1.23 μm, about 1.24 μm, about 1.25 μm, about 1.26 μm, about 1.27 μm, about 1.28 μm, about 1.29 μm, about 1.3 μm, about 1.31 μm, about 1.32 μm, about 1.33 μm, about 1.34 μm, about 1.35 μm, about 1.36 μm, about 1.37 μm, about 1.38 μm, about 1.39 μm, about 1.4 μm, about 1.41 μm, about 1.42 μm, about 1.43 μm, about 1.44 μm, about 1.45 μm, about 1.46 μm, about 1.47 μm, about 1.48 μm, about 1.49 μm, about 1.5 μm, about 1.51 μm, about 1.52 μm, about 1.53 μm, about 1.54 μm, about 1.55 μm, about 1.56 μm, about 1.57 μm, about 1.58 μm, about 1.59 μm, about 1.6 μm, about 1.61 μm, about 1.62 μm, about 1.63 μm, about 1.64 μm, about 1.65 μm, about 1.66 μm, about 1.67 μm, about 1.68 μm, about 1.69 μm, about 1.7 μm, about 1.71 μm, about 1.72 μm, about 1.73 μm, about 1.74 μm, about 1.75 μm, about 1.76 μm, about 1.77 μm, about 1.78 μm, about 1.79 μm, about 1.8 μm, about 1.81 μm, about 1.82 μm, about 1.83 μm, about 1.84 μm, about 1.85 μm, about 1.86 μm, about 1.87 μm, about 1.88 μm, about 1.89 μm, about 1.9 μm, about 1.91 μm, about 1.92 μm, about 1.93 μm, about 1.94 μm, about 1.95 μm, about 1.96 μm, about 1.97 μm, about 1.98 μm, about 1.99 μm, about 2 μm, about 2.01 μm, about 2.02 μm, about 2.03 μm, about 2.04 μm, about 2.05 μm, about 2.06 μm, about 2.07 μm, about 2.08 μm, about 2.09 μm, about 2.1 μm, about 2.11 μm, about 2.12 μm, about 2.13 μm, about 2.14 μm, about 2.15 μm, about 2.16 μm, about 2.17 μm, about 2.18 μm, about 2.19 μm, about 2.2 μm, about 2.21 μm, about 2.22 μm, about 2.23 μm, about 2.24 μm, about 2.25 μm, about 2.26 μm, about 2.27 μm, about 2.28 μm, about 2.29 μm, about 2.3 μm, about 2.31 μm, about 2.32 μm, about 2.33 μm, about 2.34 μm, about 2.35 μm, about 2.36 μm, about 2.37 μm, about 2.38 μm, about 2.39 μm, about 2.4 μm, about 2.41 μm, about 2.42 μm, about 2.43 μm, about 2.44 μm, about 2.45 μm, about 2.46 μm, about 2.47 μm, about 2.48 μm, about 2.49 μm, about 2.5 μm, about 2.51 μm, about 2.52 μm, about 2.53 μm, about 2.54 μm, about 2.55 μm, about 2.56 μm, about 2.57 μm, about 2.58 μm, about 2.59 μm, about 2.6 μm, about 2.61 μm, about 2.62 μm, about 2.63 μm, about 2.64 μm, about 2.65 μm, about 2.66 μm, about 2.67 μm, about 2.68 μm, about 2.69 μm, about 2.7 μm, about 2.71 μm, about 2.72 μm, about 2.73 μm, about 2.74 μm, about 2.75 μm, about 2.76 μm, about 2.77 μm, about 2.78 μm, about 2.79 μm, about 2.8 μm, about 2.81 μm, about 2.82 μm, about 2.83 μm, about 2.84 μm, about 2.85 μm, about 2.86 μm, about 2.87 μm, about 2.88 μm, about 2.89 μm, about 2.9 μm, about 2.91 μm, about 2.92 μm, about 2.93 μm, about 2.94 μm, about 2.95 μm, about 2.96 μm, about 2.97 μm, about 2.98 μm, about 2.99 μm, about 3 μm, about 3.01 μm, about 3.02 μm, about 3.03 μm, about 3.04 μm, about 3.05 μm, about 3.06 μm, about 3.07 μm, about 3.08 μm, about 3.09 μm, about 3.1 μm, about 3.11 μm, about 3.12 μm, about 3.13 μm, about 3.14 μm, about 3.15 μm, about 3.16 μm, about 3.17 μm, about 3.18 μm, about 3.19 μm, about 3.2 μm, about 3.21 μm, about 3.22 μm, about 3.23 μm, about 3.24 μm, about 3.25 μm, about 3.26 μm, about 3.27 μm, about 3.28 μm, about 3.29 μm, about 3.3 μm, about 3.31 μm, about 3.32 μm, about 3.33 μm, about 3.34 μm, about 3.35 μm, about 3.36 μm, about 3.37 μm, about 3.38 μm, about 3.39 μm, about 3.4 μm, about 3.41 μm, about 3.42 μm, about 3.43 μm, about 3.44 μm, about 3.45 μm, about 3.46 μm, about 3.47 μm, about 3.48 μm, about 3.49 μm, about 3.5 μm, about 3.51 μm, about 3.52 μm, about 3.53 μm, about 3.54 μm, about 3.55 μm, about 3.56 μm, about 3.57 μm, about 3.58 μm, about 3.59 μm, about 3.6 μm, about 3.61 μm, about 3.62 μm, about 3.63 μm, about 3.64 μm, about 3.65 μm, about 3.66 μm, about 3.67 μm, about 3.68 μm, about 3.69 μm, about 3.7 μm, about 3.71 μm, about 3.72 μm, about 3.73 μm, about 3.74 μm, about 3.75 μm, about 3.76 μm, about 3.77 μm, about 3.78 μm, about 3.79 μm, about 3.8 μm, about 3.81 μm, about 3.82 μm, about 3.83 μm, about 3.84 μm, about 3.85 μm, about 3.86 μm, about 3.87 μm, about 3.88 μm, about 3.89 μm, about 3.9 μm, about 3.91 μm, about 3.92 μm, about 3.93 μm, about 3.94 μm, about 3.95 μm, about 3.96 μm, about 3.97 μm, about 3.98 μm, about 3.99 μm, about 4 μm, about 4.01 μm, about 4.02

μm, about 4.03 μm, about 4.04 μm, about 4.05 μm, about 4.06 μm, about 4.07 μm, about 4.08 μm, about 4.09 μm, about 4.1 μm, about 4.11 μm, about 4.12 μm, about 4.13 μm, about 4.14 μm, about 4.15 μm, about 4.16 μm, about 4.17 μm, about 4.18 μm, about 4.19 μm, about 4.2 μm, about 4.21 μm, about 4.22 μm, about 4.23 μm, about 4.24 μm, about 4.25 μm, about 4.26 μm, about 4.27 μm, about 4.28 μm, about 4.29 μm, about 4.3 μm, about 4.31 μm, about 4.32 μm, about 4.33 μm, about 4.34 μm, about 4.35 μm, about 4.36 μm, about 4.37 μm, about 4.38 μm, about 4.39 μm, about 4.4 μm, about 4.41 μm, about 4.42 μm, about 4.43 μm, about 4.44 μm, about 4.45 μm, about 4.46 μm, about 4.47 μm, about 4.48 μm, about 4.49 μm, about 4.5 μm, about 4.51 μm, about 4.52 μm, about 4.53 μm, about 4.54 μm, about 4.55 μm, about 4.56 μm, about 4.57 μm, about 4.58 μm, about 4.59 μm, about 4.6 μm, about 4.61 μm, about 4.62 μm, about 4.63 μm, about 4.64 μm, about 4.65 μm, about 4.66 μm, about 4.67 μm, about 4.68 μm, about 4.69 μm, about 4.7 μm, about 4.71 μm, about 4.72 μm, about 4.73 μm, about 4.74 μm, about 4.75 μm, about 4.76 μm, about 4.77 μm, about 4.78 μm, about 4.79 μm, about 4.8 μm, about 4.81 μm, about 4.82 μm, about 4.83 μm, about 4.84 μm, about 4.85 μm, about 4.86 μm, about 4.87 μm, about 4.88 μm, about 4.89 μm, about 4.9 μm, about 4.91 μm, about 4.92 μm, about 4.93 μm, about 4.94 μm, about 4.95 μm, about 4.96 μm, about 4.97 μm, about 4.98 μm, about 4.99 μm, or about 5 μm, or anywhere in between.

In some examples, the surface extends from the exterior face of the metal article to a depth of about 2.0 μm within the interior of the metal article (e.g., from the exterior face of the metal article to a depth of about 0.1 μm, to a depth of about 0.2 μm, to a depth of about 0.3 μm, to a depth of about 0.4 μm, to a depth of about 0.5 μm, to a depth of about 0.6 μm, to a depth of about 0.7 μm, to a depth of about 0.8 μm, to a depth of about 0.9 μm, to a depth of about 1 μm, to a depth of about 1.1 μm, to a depth of about 1.2 μm, to a depth of about 1.3 μm, to a depth of about 1.4 μm, to a depth of about 1.5 μm, to a depth of about 1.6 μm, to a depth of about 1.7 μm, to a depth of about 1.8 μm, to a depth of about 1.9 μm, or to a depth of about 2.0 μm). In some aspects, the surface can extend from any exterior surface of the metal article. For example, the surface can extend from a first side of the metal article (e.g., a top surface of a metal sheet), a second side of the metal article (e.g., a bottom surface of a metal sheet), a third side of the metal article (e.g., a first edge of a metal sheet), or a fourth side of the metal article (e.g., a second edge of a metal sheet).

As used herein, the term "subsurface" refers to the portion of the metal article that extends from the surface described above to the interior of the metal article to a depth of up to about 30 μm (e.g., from about 5 μm to about 30 μm, from about 5 μm to about 25 μm, from about 61 μm to about 25 μm, from about 71 μm to about 20 μm, from about 81 μm to about 15 μm, from about 51 μm to about 20 μm, from about 10 μm to about 30 μm, from about 51 μm to about 15 μm, or from about 51 μm to about 10 μm). Optionally, the subsurface refers to the portion of the metal article that extends from the surface (e.g., from a depth of about 5 μm) into the interior of the metal article to a depth of about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, or about 30 μm.

As described herein, the term "bulk" refers to an interior of the metal article extending from a first subsurface to at least a second subsurface, or from a depth of about 30 μm from a first surface to a depth of about 30 μm from at least a second surface (e.g., from a depth of about 30 μm from a top of a plate, shate, or sheet to a depth of about 30 μm from a bottom of a plate, shate, or sheet). Optionally, the term "bulk"refers to any volume of the metal article that is not otherwise described as "surface"or "subsurface."

Among other properties, the metal articles described herein contain a coating that corresponds to a predominant alloying element in the metal. In some non-limiting examples, provided herein is a Si-based coating that can be applied to (i) an aluminum alloy containing Si as the predominant alloying element (i.e., a 4xxx series aluminum alloy), (ii) an aluminum alloy having Si as one of a plurality of predominantly present alloying elements (e.g., a 6xxx series aluminum alloy having Si and magnesium (Mg) as predominant alloying elements), (iii) an aluminum alloy containing excess Si, (iv) a metal having a surface enriched with Si-containing compounds (e.g., a steel alloy coated with an aluminum-silicon (Al—Si) layer), and/or (v) an aluminum alloy having Si in an amount greater than impurity levels (e.g., certain 5xxx series aluminum alloys).

In certain aspects, the Si and optionally Mg content (e.g., in a 6xxx series aluminum alloy) and ratios are controlled to enhance strength and formability. In some cases, the metal articles described herein includes excess Si. Optionally, the Si and Mg content are controlled such that excess Si is present in the metal article as described herein. Excess Si content can be calculated according to the method described in U.S. Pat. No. 4,614,552, col. 4, lines 49-52, which is incorporated herein by reference. Briefly, Mg and Si combine as $Mg_2Si$, imparting a considerable strength improvement after age-hardening. In addition, Si containing constituents, such as Al(FeMn)Si, can form. Excess Si is present when the Si content is above the stoichiometric ratio of $Mg_2Si$ and above the amount included in Al(FeMn)Si constituents. The excess Si content can be calculated by subtracting from the total Si content the Si needed for $Mg_2Si$ (Mg/1.73) and the Fe-containing phase (Fe/3). The excess Si content can be from about 1.4 wt. % to about 25 wt. % (e.g., from about 1.5 wt. % to about 20 wt. %, from about 1.7 wt. % to about 15 wt. %, from about 1.9 wt. % to about 10 wt. %, or from about 2 wt. % to about 5 wt. %). For example, the excess Si content can be about 1.4%, about 1.5%, about 1.6%, about 1.7%, about 1.8%, about 1.9%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.4%, about 3.5%, about 3.6%, about 3.7%, about 3.8%, about 3.9%, about 4%, about 4.1%, about 4.2%, about 4.3%, about 4.4%, about 4.5%, about 4.6%, about 4.7%, about 4.8%, about 4.9%, about 5%, about 5.1%, about 5.2%, about 5.3%, about 5.4%, about 5.5%, about 5.6%, about 5.7%, about 5.8%, about 5.9%, about 6%, about 6.1%, about 6.2%, about 6.3%, about 6.4%, about 6.5%, about 6.6%, about 6.7%, about 6.8%, about 6.9%, about 7%, about 7.1%, about 7.2%, about 7.3%, about 7.4%, about 7.5%, about 7.6%, about 7.7%, about 7.8%, about 7.9%, about 8%, about 8.1%, about 8.2%, about 8.3%, about 8.4%, about 8.5%, about 8.6%, about 8.7%, about 8.8%, about 8.9%, about 9%, about 9.1%, about 9.2%, about 9.3%, about 9.4%, about 9.5%, about 9.6%, about 9.7%, about 9.8%, about 9.9%, about 10%, about 10.1%, about 10.2%, about 10.3%, about 10.4%, about 10.5%, about 10.6%, about 10.7%, about 10.8%, about 10.9%, about 11%, about 11.1%, about 11.2%, about 11.3%, about 11.4%, about 11.5%, about 11.6%, about 11.7%, about 11.8%, about 11.9%, about 12%, about 12.1%, about 12.2%, about 12.3%, about 12.4%, about 12.5%, about 12.6%, about 12.7%, about 12.8%, about 12.9%, about 13%, about 13.1%, about 13.2%, about 13.3%, about 13.4%, about 13.5%, about 13.6%, about 13.7%, about 13.8%, about 13.9%, about 14%, about 14.1%, about 14.2%, about 14.3%, about 14.4%, about 14.5%, about 14.6%, about 14.7%, about 14.8%, about 14.9%, about 15%, about 15.1%, about 15.2%, about 15.3%, about 15.4%, about 15.5%, about 15.6%, about 15.7%, about 15.8%, about 15.9%, about 16%, about 16.1%, about 16.2%, about 16.3%, about 16.4%, about 16.5%, about 16.6%, about 16.7%, about 16.8%, about 16.9%, about 17%, about 17.1%, about 17.2%, about 17.3%, about 17.4%, about 17.5%, about 17.6%, about 17.7%, about 17.8%, about 17.9%, about 18 %, about 18.1 %, about 18.2 %, about 18.3 %, about 18.4 %, about 18.5 %, about 18.6 %, about 18.7%, about 18.8%, about 18.9%, about 19%, about 19.1%, about 19.2%, about 19.3%, about 19.4%, about 19.5%, about 19.6%, about 19.7%, about 19.8%, about 19.9%, about 20%, about 20.1%, about 20.2%, about 20.3%, about 20.4%, about 20.5%, about 20.6%, about 20.7%, about 20.8%, about 20.9%, about 21%, about 21.1%, about 21.2%, about 21.3%, about 21.4%, about 21.5%, about 21.6%, about 21.7%, about 21.8%, about 21.9%, about 22%, about 22.1%, about 22.2%, about 22.3%, about 22.4%, about 22.5%, about 22.6%, about 22.7%, about 22.8%, about 22.9%, about 23%, about 23.1%, about 23.2%, about 23.3%, about 23.4%, about 23.5%, about 23.6%, about 23.7%, about 23.8%, about 23.9%, about 24%, about 24.1%, about 24.2%, about 24.3%, about 24.4%, about 24.5%, about 24.6%, about 24.7%, about 24.8%, about 24.9%, or about 25%.

In some examples, an alloying element as described herein can diffuse throughout the metal article such that the concentration of the alloying element is distributed throughout a full thickness (e.g., a bulk of the metal) of the metal article (i.e., at least at a first surface, within a subsurface, and within the bulk portions). For example, the metal article can include a concentration of Si that is distributed throughout the metal article and can migrate to at least the first surface during various processing steps, including homogenizing, hot rolling, cold rolling, warm rolling, solutionizing, annealing, or any combination thereof. In some further examples, after migrating to at least the first surface portion, the concentration of Si can be frozen within at least the first surface portion by employing any of quenching techniques known to one of skill in the art. Such metal articles display exceptional and unexpected bond durability properties.

In some examples, the metal article is aluminum, an aluminum alloy, magnesium, a magnesium-based material, titanium, a titanium-based material, copper, a copper-based material, steel, a steel-based material, bronze, a bronze-based material, brass, a brass-based material, a composite, a sheet used in composites, or any other suitable metal or combination of materials. The metal article may include monolithic materials, as well as non-monolithic materials such as roll-bonded materials, clad materials, composite materials (such as but not limited to carbon fiber-containing materials), or various other materials. In some examples, the metal article is a metal coil, a metal strip, a metal plate, a metal sheet, a metal billet, a metal ingot, or the like. In some cases, the systems and methods described herein can be used with a non-metal article.

In some non-limiting examples, the metal article can be an aluminum alloy article. The aluminum alloy article can have any suitable composition. In non-limiting examples, the aluminum alloy articles can include Si as a predominant alloying element (e.g., a 4xxx series aluminum alloy), or the aluminum alloy article can include Si as one of a plurality of predominantly alloying elements (e.g., a 6xxx series aluminum alloy). Optionally, the aluminum alloy article can include Si in an amount greater than impurity levels (e.g., a 5xxx series aluminum alloy article). The 4xxx series aluminum alloys, 5xxx series aluminum alloys, or 6xxx series aluminum alloys can be modified to include a Si content (e.g., excess Si) as described herein.

Non-limiting exemplary 4xxx series aluminum alloys for use as the aluminum alloy article can include AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

Non-limiting exemplary 5xxx series aluminum alloys for use as the aluminum alloy article can include AA5182, AA5183, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Non-limiting exemplary 6xxx series aluminum alloys for use as the aluminum alloy article can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

In some cases, the metal article can be a steel alloy article. In some non-limiting examples, the steel alloy article can include an Al-Si layer incorporated on at least a first surface portion of the steel alloy article, thus providing Si enrichment on at least the first surface portion of the steel alloy article.

Pretreatment Compositions

Described herein are pretreatment compositions that impart increased bond durability to metal articles. The pretreatment compositions include at least one Si-containing compound, and optionally, one or more additional components. Suitable Si-containing compounds (e.g., Si-containing compounds containing $SiO_x$ moieties) for use in the pretreatment compositions can include, for example, (3-aminopropyl)triethoxysilane (APS), 1,2-bis(triethoxysilyl)ethane (BTSE), glycidyl-oxypropyl-trimethoxysilane (GPS), tetraethoxysilane (TEOS), vinyltriethoxysilane (VTES), bis[3-(trimethoxysilyl)propyl]amine, vinyltrimethoxysilane, methyltriethoxysilane (MTES), and combinations of these. The Si-containing compounds can optionally be present in an aqueous medium, an organic solvent, or a combination of these. The aqueous medium can include, for example, tap water, purified water, distilled water, demineralized water, and/or deionized water. Suitable organic solvents include, for example, polar organic solvents. In some examples, organic solvents such as acetone, ethanol, methanol, isopropanol, and/or ethyl acetate can be present. Optionally, the solution containing at least one Si-containing compound includes a combination of aqueous media and organic solvents. In some examples, the aqueous medium or media can be present in the solution in an amount of at least about 5 vol. %, at least about 10 vol. %, at least about 15 vol. %, at least about 20 vol. %, at least about 25 vol. %, at least about 30 vol. %, at least about 35 vol. %, at least about 40 vol. %, at least about 45 vol. %, at least about 50 vol. %, at least about 55 vol. %, at least about 60 vol. %, at least about 65 vol. %, at least about 70 vol. %, at least about 75 vol. %, at least about 80 vol. %, at least about 85 vol. %, at least about 90 vol. %, or at least about 95 vol.

%. In some examples, the organic solvent(s) can be present in the solution in an amount of at least about 5 vol. %, at least about 10 vol. %, at least about 15 vol. %, at least about 20 vol. %, at least about 25 vol. %, at least about 30 vol. %, at least about 35 vol. %, at least about 40 vol. %, at least about 45 vol. %, at least about 50 vol. %, at least about 55 vol. %, at least about 60 vol. %, at least about 65 vol. %, at least about 70 vol. %, at least about 75 vol. %, at least about 80 vol. %, at least about 85 vol. %, at least about 90 vol. %, or at least about 95 vol. %.

Optionally, the solution containing the Si-containing compound includes an aqueous medium that can include, for example, acetone, ethanol, methanol, isopropanol and/or ethyl acetate in amounts of up to about 90 vol. % (e.g., up to about 85 vol. %, up to about 80 vol. %, up to about 75 vol. %, up to about 70 vol. %, up to about 65 vol. %, up to about 60 vol. %, up to about 55 vol. %, up to about 50 vol. %, up to about 45 vol. %, up to about 40 vol. %, up to about 35 vol. %, up to about 30 vol. %, up to about 25 vol. %, up to about 20 vol. %, up to about 15 vol. %, or up to about 10 vol. %).

Methods of Preparing the Metal Articles

As described below, certain processing steps and conditions, including the rolling steps and conditions, heat treatment steps and conditions, and/or surface preparation steps and conditions (e.g., etching and/or cleaning, to name a few) provide the metal articles described above having the desirable bond durability properties. In some non-limiting examples, the metal articles described herein can be aluminum alloy articles. The methods of providing aluminum alloy articles as described herein can include the steps of providing an aluminum alloy having Si as a predominant alloying element (e.g., a 4xxx series aluminum alloy, a 5xxx series aluminum alloy, or a 6xxx series aluminum alloy), providing a Si-containing pretreatment to form a coating having Si as a predominant element on the aluminum alloy article, and processing the coated aluminum alloy article to stimulate Si—O—Si bonding interactions between Si-containing compounds present in the aluminum alloy article (e.g., excess Si), and $SiO_x$ moieties present in the coating. In some cases, providing the aluminum alloy having Si as a predominant alloying element can be performed according to methods commonly known in the art, as described briefly below.

In some non-limiting examples, controlling the diffusion rate of the migrant elements can provide selective diffusion of the migrant elements. For example, heat can be extracted from the molten metal at a rate that can promote diffusion of a first migrant element and simultaneously suppress diffusion of a second migrant element. Thus, the metal article surface can be selectively enriched by a select migrant element (e.g., Si) during solidification of the molten alloy to provide the metal article.

Any suitable metal as described herein (i.e., containing Si, such as excess Si) can be cast by any suitable method to result in a cast article. In some examples, the metals can be cast using a direct chill (DC) casting process to form an ingot. In some examples, the metals can be cast using a continuous casting (CC) process that may include, but is not limited to, the use of twin-belt casters, twin-roll casters, or block casters, to form a cast article in the form of a billet, a slap, a shate, a strip, and the like. The cast article can then be subjected to processing steps, including, but not limited to, homogenization, hot rolling, cold rolling, solution heat treatment, quenching, and/or aging based on the particular metal (e.g., the particular aluminum alloy series) used to prepare the article. Following processing, the metal article can undergo surface preparation steps as further described below.

Surface Preparation

Optionally, the aluminum alloy articles described herein and cast by DC casting or CC and subsequently processed can be subjected to surface preparation processes described below. Although this description is provided in the context of an aluminum alloy, the aluminum alloy articles and methods described herein can be used for any suitable metal articles, and any suitable metal article having any suitable gauge, including foil, sheet, plate, slab, billet, ingot, or the like, as well as any shape metal article.

Cleaning

The pretreatment process described herein includes a step of applying a cleaner (also referred to herein as an entry cleaner) to one or more surfaces of the aluminum alloy articles. The entry cleaner removes residual oils, or loosely adhering oxides, from the coil surface. Optionally, the entry cleaning can be performed using a solvent (e.g., an aqueous or organic solvent). Optionally, one or more additives can be added to the solvent.

Pre-Etching

The method described herein also includes a step of pre-etching one or more surfaces of the aluminum alloy articles. The surface of the aluminum alloy articles can be pre-etched using an acid etch (i.e., an etching procedure that includes an acidic solution). The acid etch prepares the surface for subsequent pretreatment. Exemplary acids for performing the acid etch include sulfuric acid, hydrofluoric acid, nitric acid, phosphoric acid, and combinations of these.

In some non-limiting examples, the pre-etching removes up to about 3 $g/m^2$ of a surface material and exposes Si present in the aluminum alloy articles at or near the surface of the aluminum alloy articles. In some cases, the exposed Si is elemental Si, Si in a Si-containing compound (e.g., $Mg_2Si$), or the like.

Pretreatment

After the pre-etching step, the surface of the metal article can be rinsed with water or a solvent. A pretreatment (e.g., the Si-containing pretreatment described above) can then be applied to the surface of the metal article. Optionally, the pretreatment can include an adhesion promoter, a corrosion inhibitor, a coupling agent, an antimicrobial agent, or a mixture thereof. In some non-limiting examples, the excess Si in the aluminum alloy articles can interact with an O atom present in the pretreatment (e.g., $SiO_x$ moieties) and enhance the pretreatment adhesion via the Si—O—Si bonding interactions. In some examples, excess Si within the surface of the metal article can interact with O atoms within the surface of the metal article (e.g., $Al_2O_3$) and/or Si and/or O atoms in the pretreatment layer (e.g., $SiO_x$ moieties) and enhance the pretreatment adhesion via the Si—O—Si interaction. In other aspects, excess Si within the surface of the metal article can interact with O atoms within the surface of the metal article (e.g., metal oxides (e.g., $Al_2O_3$), O atoms in the metal lattice, oxidized excess Si, O present in Si-containing compounds within the alloy, other O-containing compounds in the alloy, or the like) and Si atoms in the pretreatment layer (e.g., Si atoms or $SiO_x$ moieties) and enhance the pretreatment adhesion via the Si—O—Si interaction.

In some cases, the silicon-containing compound in the Si-based pretreatment can include a $SiO_x$ moiety, where x is an integer in a range of from 1 to 4 (e.g., 1, 2, 3, or 4). For example, pretreatments such as a siloxane, a polysiloxane, a silanol, a tetraethyl orthosilicate, a tetraalkyl silicate, hexamethyldisiloxane (HMDSO), tetraethoxysilane (TEOS), triethoxysilane, or the like can contain $SiO_x$ moieties. Accordingly, siloxane, polysiloxane, silanol, tetraethyl orthosilicate, tetraalkyl silicate, hexamethyldisiloxane (HMDSO), tetraethoxysilane (TEOS), triethoxysilane, or the like, can be used individually or in any combination thereof as a pretreatment.

In some cases, the pretreatment can be applied by bar coating, roller coating, spray coating, dip coating, any suitable coating technique known in the art, or any combination thereof. After coating, the pretreatment can be cured to provide a coating on the aluminum alloy surface. In certain cases, curing can be performed at a temperature of from about 200°C. to about 300°C. (e.g., from about 210°C. to about 290°C., from about 215°C. to about 285°C., from about 220°C. to about 280°C., from about 220°C. to about 300°C., from about 200°C. to about 275°C., from about 205°C. to about 295°C., from about 225°C. to about 275°C., from about 215°C. to about 300°C., from about 230°C. to about 270°C., from about 235°C. to about 265°C., or from about 240°C. to about 260°C.). For example, curing can be performed at a temperature of about 200°C., about 201°C., about 202°C., about 203°C., about 204°C., about 205°C., about 206°C., about 207°C., about 208°C., about 209°C., about 210°C., about 211°C., about 212°C., about 213°C., about 214°C., about 215°C., about 216°C., about 217°C., about 218°C., about 219°C., about 220°C., about 221°C., about 222°C., about 223°C., about 224°C., about 225°C., about 226°C., about 227°C., about 228°C., about 229°C., about 230°C., about 231°C., about 232°C., about 233°C., about 234°C., about 235°C., about 236°C., about 237°C., about 238°C., about 239°C., about 240°C., about 241°C., about 242°C., about 243°C., about 244°C., about 245°C., about 246°C., about 247°C., about 248°C., about 249°C., about 250°C., about 251°C., about 252°C., about 253°C., about 254°C., about 255°C., about 256°C., about 257°C., about 258°C., about 259°C., about 260°C., about 261°C., about 262°C., about 263°C., about 264°C., about 265°C., about 266°C., about 267°C., about 268°C., about 269°C., about 270°C., about 271°C., about 272°C., about 273°C., about 274°C., about 275°C., about 276°C., about 277°C., about 278°C., about 279°C., about 280°C., about 281°C., about 282°C., about 283°C., about 284°C., about 285°C., about 286°C., about 287°C., about 288°C., about 289°C., about 290°C., about 291°C., about 292°C., about 293°C., about 294°C., about 295°C., about 296°C., about 297°C., about 298°C., about 299°C., or about 300°C.

In certain examples, after applying the pretreatment, the curing can be performed for a period of time from about 5 seconds to about 15 seconds (e.g., from about 6 seconds to about 14 seconds, from about 6 seconds to about 12 seconds, from about 6 seconds to about 10 seconds, from about 5 seconds to about 10 seconds, from 7 seconds to about 13 seconds, or from about 7 seconds to about 8 seconds). For example, the curing can be performed for about 5 seconds, about 6 seconds, about 7 seconds, about 8 seconds, about 9 seconds, about 10 seconds, about 11 seconds, about 12 seconds, about 13 seconds, about 14 seconds, or about 15 seconds.

In certain aspects, the applied pretreatment can have a coating weight of from about 0.5 mg/m$^2$ to about 100 mg/m$^2$ (e.g., from about 1 mg/m$^2$ to about 100 mg/m$^2$, from about 2 mg/m$^2$ to about 90 mg/m$^2$, from about 3 mg/m$^2$ to about 80 mg/m$^2$, from about 4 mg/m$^2$ to about 70 mg/m$^2$, from about 5 mg/m$^2$ to about 60 mg/m$^2$, from about 6 mg/m$^2$ to about 50 mg/m$^2$, from about 7 mg/m$^2$ to about 40 mg/m$^2$, from about 8 mg/m$^2$ to about 30 mg/m$^2$, or from about 9 mg/m$^2$ to about 20 mg/m$^2$). For example, the applied pretreatment can have a coating weight of about 0.5 mg/m$^2$, about 0.6 mg/m$^2$, about 0.7 mg/m$^2$, about 0.8 mg/m$^2$, about 0.9 mg/m$^2$, about 1 mg/m$^2$, about 1.1 mg/m$^2$, about 1.2 mg/m$^2$, about 1.3 mg/m$^2$, about 1.4 mg/m$^2$, about 1.5 mg/m$^2$, about 1.6 mg/m$^2$, about 1.7 mg/m$^2$, about 1.8 mg/m$^2$, about 1.9 mg/m$^2$, about 2 mg/m$^2$, about 2.1 mg/m$^2$, about 2.2 mg/m$^2$, about 2.3 mg/m$^2$, about 2.4 mg/m$^2$, about 2.5 mg/m$^2$, about 2.6 mg/m$^2$, about 2.7 mg/m$^2$, about 2.8 mg/m$^2$, about 2.9 mg/m$^2$, about 3 mg/m$^2$, about 3.1 mg/m$^2$, about 3.2 mg/m$^2$, about 3.3 mg/m$^2$, about 3.4 mg/m$^2$, about 3.5 mg/m$^2$, about 3.6 mg/m$^2$, about 3.7 mg/m$^2$, about 3.8 mg/m$^2$, about 3.9 mg/m$^2$, about 4 mg/m$^2$, about 4.1 mg/m$^2$, about 4.2 mg/m$^2$, about 4.3 mg/m$^2$, about 4.4 mg/m$^2$, about 4.5 mg/m$^2$, about 4.6 mg/m$^2$, about 4.7 mg/m$^2$, about 4.8 mg/m$^2$, about 4.9 mg/m$^2$, about 5 mg/m$^2$, about 5.1 mg/m$^2$, about 5.2 mg/m$^2$, about 5.3 mg/m$^2$, about 5.4 mg/m$^2$, about 5.5 mg/m$^2$, about 5.6 mg/m$^2$, about 5.7 mg/m$^2$, about 5.8 mg/m$^2$, about 5.9 mg/m$^2$, about 6 mg/m$^2$, about 6.1 mg/m$^2$, about 6.2 mg/m$^2$, about 6.3 mg/m$^2$, about 6.4 mg/m$^2$, about 6.5 mg/m$^2$, about 6.6 mg/m$^2$, about 6.7 mg/m$^2$, about 6.8 mg/m$^2$, about 6.9 mg/m$^2$, about 7 mg/m$^2$, about 7.1 mg/m$^2$, about 7.2 mg/m$^2$, about 7.3 mg/m$^2$, about 7.4 mg/m$^2$, about 7.5 mg/m$^2$, about 7.6 mg/m$^2$, about 7.7 mg/m$^2$, about 7.8 mg/m$^2$, about 7.9 mg/m$^2$, about 8 mg/m$^2$, about 8.1 mg/m$^2$, about 8.2 mg/m$^2$, about 8.3 mg/m$^2$, about 8.4 mg/m$^2$, about 8.5 mg/m$^2$, about 8.6 mg/m$^2$, about 8.7 mg/m$^2$, about 8.8 mg/m$^2$, about 8.9 mg/m$^2$, about 9 mg/m$^2$, about 9.1 mg/m$^2$, about 9.2 mg/m$^2$, about 9.3 mg/m$^2$, about 9.4 mg/m$^2$, about 9.5 mg/m$^2$, about 9.6 mg/m$^2$, about 9.7 mg/m$^2$, about 9.8 mg/m$^2$, about 9.9 mg/m$^2$, about 10 mg/m$^2$, about 11 mg/m$^2$, about 12 mg/m$^2$, about 13 mg/m$^2$, about 14 mg/m$^2$, about 15 mg/m$^2$, about 16 mg/m$^2$, about 17 mg/m$^2$, about 18 mg/m$^2$, about 19 mg/m$^2$, about 20 mg/m$^2$, about 21 mg/m$^2$, about 22 mg/m$^2$, about 23 mg/m$^2$, about 24 mg/m$^2$, about 25 mg/m$^2$, about 26 mg/m$^2$, about 27 mg/m$^2$, about 28 mg/m$^2$, about 29 mg/m$^2$, about 30 mg/m$^2$, about 31 mg/m$^2$, about 32 mg/m$^2$, about 33 mg/m$^2$, about 34 mg/m$^2$, about 35 mg/m$^2$, about 36 mg/m$^2$, about 37 mg/m$^2$, about 38 mg/m$^2$, about 39 mg/m$^2$, about 40 mg/m$^2$, about 41 mg/m$^2$, about 42 mg/m$^2$, about 43 mg/m$^2$, about 44 mg/m$^2$, about 45 mg/m$^2$, about 46 mg/m$^2$, about 47 mg/m$^2$, about 48 mg/m$^2$, about 49 mg/m$^2$, about 50 mg/m$^2$, about 51 mg/m$^2$, about 52 mg/m$^2$, about 53 mg/m$^2$, about 54 mg/m$^2$, about 55 mg/m$^2$, about 56 mg/m$^2$, about 57 mg/m$^2$, about 58 mg/m$^2$, about 59 mg/m$^2$, about 60 mg/m$^2$, about 61 mg/m$^2$, about 62 mg/m$^2$, about 63 mg/m$^2$, about 64 mg/m$^2$, about 65 mg/m$^2$, about 66 mg/m$^2$, about 67 mg/m$^2$, about 68 mg/m$^2$, about 69 mg/m$^2$, about 70 mg/m$^2$, about 71 mg/m$^2$, about 72 mg/m$^2$, about 73 mg/m$^2$, about 74 mg/m$^2$, about 75 mg/m$^2$, about 76 mg/m$^2$, about 77 mg/m$^2$, about 78 mg/m$^2$, about 79 mg/m$^2$, about 80 mg/m$^2$, about 81 mg/m$^2$, about 82 mg/m$^2$, about 83 mg/m$^2$, about 84 mg/m$^2$, about 85 mg/m$^2$, about 86 mg/m$^2$, about 87 mg/m$^2$, about 88 mg/m$^2$, about 89 mg/m$^2$, about 90 mg/m$^2$, about 91 mg/m$^2$, about 92 mg/m$^2$, about 93 mg/m$^2$, about 94 mg/m$^2$, about 95 mg/m$^2$, about 96 mg/m$^2$, about 97 mg/m$^2$, about 98 mg/m$^2$, about 99 mg/m$^2$, or about 100 mg/m$^2$.

In certain aspects, the applied pretreatment can have a dry thickness of from about 0.01 nm to about 20 nm (e.g., from about 1 nm to about 20 nm, from about 1 nm to about 19 nm, from about 2 nm to about 18 nm, from about 3 nm to about 17 nm, from about 5 nm to about 20 nm, from about 4 nm to about 16 nm, from about 5 nm to about 15 nm, from about 6 nm to about 14 nm, from about 7 nm to about 13 nm, from about 8 nm to about 12 nm, from about 9 nm to about 11 nm, from about 2 nm to about 14 nm, from about 3 nm to about 20 nm, from about 1 nm to about 19 nm, or from 4 nm to about 19 nm).

Methods of Joining Metal Articles

In some non-limiting examples, a method of joining a first metal to a second metal can include (i) providing a first metal having a first surface portion comprising excess Si, (ii) applying a surface pretreatment layer comprising one or more Si-containing compounds to the first surface portion of the first metal to form a pretreated surface portion of the first metal, wherein either one of the first surface portion of the first metal or the one or more Si-containing compounds comprises O, wherein the applying stimulates Si—O—Si bonding interactions between the excess Si present in the first surface portion of the first metal and the one or more Si-containing compounds present in the surface pretreatment layer; and joining the pretreated surface portion of the first metal to a surface of a second metal.

In some non-limiting examples, the first metal (e.g., an aluminum alloy) and the second metal are joined to form a joint of any suitable configuration, including lap, edge, butt, T-butt, hem, T-edge, and the like. In some non-limiting examples, joining can be performed employing an adhesive to bond two metal products together.

In some non-limiting examples, the disclosed metal articles (e.g., joined metal articles) have improved bond durability demonstrated as sustained bond strength under harsh environmental conditions in a neutral salt spray test performed according to ASTM Standard B117. As described herein, the Si—O—Si bonding interactions of pretreated aluminum alloys as described herein improve bond durability over (a) aluminum alloys that have an excess Si content but are not pretreated with a Si-containing pretreatment, (b) aluminum alloys pretreated with a Si-containing pretreatment but do not have excess Si, and (c) aluminum alloys that do not have excess Si and are not pretreated with a Si-containing pretreatment. For example, aluminum alloys having excess Si as described herein and pretreated with a Si-containing pretreatment as described herein, and bonded to a second metal, exhibit a stronger bond durability than an aluminum alloy having excess Si and pretreated with a non-Si-containing pretreatment (e.g., a titanium-zirconium (TiZr) pretreatment) that is bonded to a second metal. Further, aluminum alloys having excess Si as described herein and pretreated with a Si-containing pretreatment as described herein, and bonded to a second metal, exhibit a stronger bond durability than an aluminum alloy not having excess Si (e.g., excess Si=0) and pretreated with a Si-containing pretreatment that is bonded to a second metal. Still further, aluminum alloys having excess Si as described herein and pretreated with a Si-containing pretreatment as described herein, and bonded to a second metal, exhibit a stronger bond durability than an aluminum alloy not having excess Si and pretreated with a non-Si-containing pretreatment (e.g., TiZr) that is bonded to a second metal.

In some examples, the second metal has one or more surfaces that contains excess Si (e.g., the excess Si is present in an amount greater than about 1.4 wt. %.). In certain aspects, the second metal is pretreated with a Si-containing pretreatment as described herein. In some cases, the excess Si in the second metal surface interacts with the one or more Si-containing compounds in the pretreatment. The Si—O—Si bonding interactions provide increased bond durability when the metal article is bonded to the first metal.

In some cases, metal articles having excess Si as described herein and pretreated with a Si-containing pretreatment as described herein exhibit an improvement in bond durability of at least about 40% as compared to a metal article not having excess Si and/or a metal article unpretreated or pretreated with a non-Si-containing pretreatment. For example, the improvement in bond durability for the metal articles pretreated with a Si-containing pretreatment as described herein can be about 45% or more, about 50% or more, about 55% or more, about 60% or more, about 65% or more, about 70% or more, or about 75% or more as compared to a metal article not having excess Si and/or a metal article unpretreated or pretreated with a non-Si-containing pretreatment.

In certain aspects, metal articles having excess Si as described herein and pretreated with a Si-containing pretreatment as described herein exhibit an insignificant loss of bond strength when subjected to a neutral salt spray test. For example, after up to 20 weeks of exposure to the neutral salt spray, the metal articles having excess Si pretreated with a Si-containing pretreatment exhibit a bond strength loss of less than about 40%, less than about 35%, less than about 30%, less than about 25%, or less than about 20%. In some comparative examples, metal articles having excess Si as described herein and pretreated with a TiZr pretreatment and subjected to a bond durability test can exhibit a bond strength loss of at least about 40% after up to 20 weeks of exposure to the neutral salt spray. For example, metal articles having excess Si and pretreated with a TiZr pretreatment can exhibit a bond strength loss of at least about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, or about 75%.

Methods of Using

The aluminum alloy articles and methods described herein can be used in automotive, electronics, and transportation applications, such as commercial vehicle, aircraft, or railway applications. For example, the aluminum alloy articles can be used for chassis, cross-member, and intra-chassis components (encompassing, but not limited to, all components between the two C channels in a commercial vehicle chassis) to gain strength, serving as a full or partial replacement of high strength steels.

In certain aspects, the aluminum alloy articles and methods can be used to prepare motor vehicle body part articles. For example, the disclosed aluminum alloy articles and methods can be used to prepare and/or formed into automobile body parts, such as bumpers, side beams, roof beams, cross beams, pillar reinforcements (e.g., A-pillars, B-pillars, and C-pillars), inner panels, side panels, floor panels, tunnels, structure panels, reinforcement panels, inner hoods, or trunk lid panels. The disclosed aluminum alloy articles and methods can also be used in aircraft or railway vehicle applications, to prepare, for example, external and internal panels.

The aluminum alloy articles and methods described herein can also be used in electronics applications, to prepare and/or formed into, for example, external and internal encasements. For example, the aluminum alloy articles and methods described herein can also be used to prepare housings for electronic devices, including mobile phones and tablet computers. In some examples, the aluminum alloy articles can be used to prepare housings for the outer casing of mobile phones (e.g., smart phones) and tablet bottom chassis.

In certain aspects, the aluminum alloy articles and methods can be used to prepare and/or formed into aerospace vehicle body part articles. For example, the disclosed aluminum alloy articles and methods can be used to prepare airplane body parts, such as skin alloys.

Optionally, the aluminum alloy articles and methods can be used to prepare and/or formed into beverage and food containers, among other uses.

In some examples, the aluminum alloy can be fabricated into an aluminum alloy article including any coating described herein. In some examples, the alloy can be fabricated into a shaped article formed from any aluminum alloy article described herein and including any coating layer formed from a pretreatment composition as described herein. In some examples, the alloy is a shaped article formed from any aluminum alloy article described herein and includes the Si-containing coating described herein, wherein the shaped article is joined to another article formed from a similar alloy, a similar metal, a different alloy or a different metal (e.g., a second metal or a second alloy). In some non-limiting examples, the aluminum alloy and the second metal and/or alloy are bonded to form a joint of any suitable configuration, including lap, edge, butt, T-butt, hem, T-edge, and the like. In some non-limiting examples, bonding can be performed employing an adhesive to bond two metal articles together. Bond durability, as used herein, refers to the bond strength after exposure to harsh conditions (e.g., a neutral salt spray test) and subsequent tensile testing (e.g., to evaluate strength of the bond after exposure to harsh conditions).

Illustrations

Illustration 1 is a pretreated metal article comprising a first surface portion comprising excess Si; and a surface pretreatment layer comprising one or more Si-containing compounds, wherein either one of the first surface portion of the first metal or the one or more Si-containing compounds comprises O, wherein Si—O—Si bonding interactions exist between the excess Si present in the first surface portion and the one or more Si-containing compounds present in the surface pretreatment layer, and wherein the surface pretreatment layer is adhered to the first surface portion.

Illustration 2 is the pretreated metal article of any preceding or subsequent illustration, wherein the excess Si is present in the first surface portion in an amount greater than about 1.4 wt. %.

Illustration 3 is the pretreated metal article of any preceding or subsequent illustration, wherein the pretreated metal article comprises aluminum or an aluminum alloy, steel, magnesium or a magnesium alloy, titanium or a titanium alloy, copper or a copper alloy, any suitable metal or metal alloy, or any combination thereof.

Illustration 4 is the pretreated metal article of any preceding or subsequent illustration, wherein the pretreated metal article is an aluminum alloy.

Illustration 5 is the pretreated metal article of any preceding or subsequent illustration, wherein the aluminum alloy comprises a 4xxx series aluminum alloy, a 5xxx series aluminum alloy, or a 6xxx series aluminum alloy.

Illustration 6 is the pretreated metal article of any preceding or subsequent illustration, wherein the pretreated metal article is an automotive structural part, an aerospace structural part, a transportation structural part, an automotive body part, an aerospace skin panel, a transportation body part, an architectural part, an aesthetic part, an electronics device housing, or a beverage or food container.

Illustration 7 is a method of joining a first metal to a second metal, comprising providing a first metal having a first surface portion comprising excess Si; applying a surface pretreatment layer comprising one or more Si-containing compounds to the first surface portion of the first metal to form a pretreated surface portion of the first metal, wherein either one of the first surface portion of the first metal or the one or more Si-containing compounds comprises O, wherein the applying stimulates Si—O—Si bonding interactions between the excess Si present in the first surface portion of the first metal and the one or more Si-containing compounds present in the surface pretreatment layer; and joining the pretreated surface portion of the first metal to a surface of a second metal.

Illustration 8 is the method of any preceding or subsequent illustration, wherein one or more of conditions (a)-(c) is achieved: (a) a bond durability between the pretreated surface portion of the first metal and the surface of a second metal is greater than a bond durability between (i) a surface portion of a metal comprising excess Si and pretreated with a surface pretreatment that does not contain one or more Si-containing compounds and (ii) a second metal; (b) a bond durability between the pretreated surface portion of the first metal and the surface of a second metal is greater than a bond durability between (i) a surface portion of a metal that does not comprise excess Si and is pretreated with a surface pretreatment that contains one or more Si-containing compounds and (ii) a second metal; or (c) a bond durability between the pretreated surface portion of the first metal and the surface of a second metal is greater than a bond durability between (i) a surface portion of a metal that does not comprise excess Si and is pretreated with a surface pretreatment that does not contain one or more Si-containing compounds and (ii) a second metal.

Illustration 9 is the method of any preceding or subsequent illustration, wherein the first metal comprises aluminum or an aluminum alloy, steel, magnesium or a magnesium alloy, titanium or a titanium alloy, copper or a copper alloy, any suitable metal or metal alloy, or any combination thereof.

Illustration 10 is the method of any preceding or subsequent illustration, wherein the first metal comprises an aluminum alloy.

Illustration 11 is the method of any preceding or subsequent illustration, wherein the aluminum alloy comprises a 4xxx series aluminum alloy, a 5xxx series aluminum alloy, or a 6xxx series aluminum alloy.

Illustration 12 is the method of any preceding or subsequent illustration, wherein the second metal comprises aluminum or an aluminum alloy, steel, magnesium or a magnesium alloy, titanium or a titanium alloy, copper or a copper alloy, any suitable metal or metal alloy, or any combination thereof.

Illustration 13 is the method of any preceding or subsequent illustration, wherein the excess Si is present in the first surface portion of at least the first metal in an amount greater than about 1.4 wt. %.

Illustration 14 is the method of any preceding or subsequent illustration, further comprising etching the first surface portion of at least the first metal prior to the applying.

Illustration 15 is the method of any preceding or subsequent illustration, wherein etching the first surface portion of at least the first metal exposes Si in the first surface portion by removing up to about 3 grams per square meter of a surface material.

Illustration 16 is the method of any preceding or subsequent illustration, further comprising cleaning the first surface portion of at least the first metal prior to the applying.

Illustration 17 is the method of any preceding or subsequent illustration, wherein cleaning the first surface portion of at least the first metal removes native oxide or hydroxide species from the first surface portion of at least the first metal.

Illustration 18 is the method of any preceding or subsequent illustration, wherein applying the surface pretreatment layer to the first surface portion of at least the first metal comprises bar coating, roll coating, spray coating, or dip coating.

Illustration 19 is the method of any preceding or subsequent illustration, further comprising curing the surface pretreatment layer.

Illustration 20 is a joined metal structure prepared according to any preceding or subsequent illustration.

Illustration 21 is the joined metal structure of any preceding or subsequent illustration, wherein the joined metal structure experiences a bond strength loss of less than 40% after 20 weeks of exposure to a neutral salt spray test.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

During the studies described in the following examples, conventional procedures were followed, unless otherwise stated. Some of the procedures are described below for illustrative purposes.

EXAMPLES

Example 1: Bond Durability

Aluminum alloys having Si as a predominant alloying element and a high concentration of Si at the aluminum alloy surface were prepared for bond durability testing. A 6xxx series aluminum alloy was used for each bond durability test sample. The aluminum alloys were cut into eight testing coupons and coated with a pretreatment. Four aluminum alloy coupons were coated with a Si-containing pretreatment (referred to as "Si-PT"), and four aluminum alloy samples were pretreated with a comparative titanium-zirconium (referred to as "TiZr") pretreatment commonly known in the art. Similarly coated coupons were then bonded with a commercially available adhesive supplied by Sika Corporation (Lyndhurst, NJ). Sika 497 and Sika 498/3 are crash-resistant structural adhesives. Sika 497 is a crash-resistant structural adhesive with a low viscosity, and Sika 498/3 is a crash-resistant structural adhesive with a high viscosity. Alloy reference sample A included two testing coupons coated with Si-PT and bonded with adhesive formulation Sika 498/3. Alloy reference sample B included two testing coupons coated with Si-PT and bonded with adhesive formulation Sika 497. Alloy reference sample C included two testing coupons coated with TiZr and bonded with adhesive formulation Sika 498/3. Alloy reference sample D included two testing coupons coated with TiZr and bonded with adhesive formulation BM4601 (supplied by Dow Automotive Systems, Wilmington, DE). Alloy reference samples A, B, C, and D were repeated to provide four test samples of each Alloy reference sample to evaluate each Alloy reference sample after different time intervals during testing. The bond durability test results are provided in Table 1 below.

TABLE 1

| Alloy Surface Treatment | | |
|---|---|---|
| Alloy Ref. | Pretreatment | Adhesive |
| A | Si-PT | Sika 498/3 |
| B | Si-PT | Sika 497 |
| C | TiZr | Sika 498/3 |
| D | TiZr | BM4601 |

Bond durability testing was performed by employing the neutral salt spray test to Alloy reference samples A, B, C, and D. Bond strength of each Alloy reference sample was tested after no exposure (e.g., 0 weeks), after 2 weeks of exposure to the neutral salt spray test, after 6 weeks of exposure to the neutral salt spray test, after 12 weeks of exposure to the neutral salt spray test, and after 20 weeks of exposure to the neutral salt spray test. Bond durability was demonstrated as a loss of bond strength for each sample (i.e., Alloy reference samples A, B, C, and D tested without exposure to the neutral salt spray test served as a benchmark of 0% strength loss). The results are summarized in Table 2 below:

TABLE 2

| Bond Durability Test Results - Strength Loss* | | | | |
|---|---|---|---|---|
| Alloy Ref. | 2 weeks | 6 weeks | 12 weeks | 20 weeks |
| A | 4.5% | 5.5% | 10.4% | 11.7% |
| B | 3.7% | 3.0% | 4.2% | 6.1% |
| C | N/A | 75.1% | 75.1% | 70.5% |
| D | N/A | 41.6% | 56.2% | 45.2% |

*Strength loss as percent of benchmark strength.

FIG. 1 is a graph showing strength loss of bonded aluminum alloy samples as described above. A strength loss of 40% (indicated by a dashed line across each set of histograms) was determined to be unacceptable. As evident in the graph, and Table 2 above, Alloy reference A and B, employing the Si-containing pretreatment coating applied to an aluminum alloy having a high concentration of Si at the aluminum alloy surface, exhibited high bond strength with minimal bond strength loss after 2 weeks, 6 weeks, 12 weeks, and 20 weeks of exposure in the neutral salt spray test, demonstrating increased bond durability when compared to current pretreatment techniques (e.g., samples pretreated with the TiZr pretreatment demonstrated greater than 40% loss of bond strength after 6 weeks, 12 weeks, and 20 weeks of neutral salt spray exposure).

FIGS. 2-5 are digital optical images of the test samples after exposure to the neutral salt spray test. Samples that survived the neutral salt spray test (e.g., samples that remained bonded after the testing interval was complete) were forcibly separated for visible evaluation. FIGS. 2A-2E show the visible results after testing for Alloy reference A. FIG. 2A shows the bonded then separated test coupons after no exposure to the neutral salt spray. FIG. 2B shows the bonded then separated test coupons after 2 weeks exposure to the neutral salt spray. FIG. 2C shows the bonded then separated test coupons after 6 weeks exposure to the neutral salt spray. FIG. 2D shows the bonded then separated test coupons after 12 weeks exposure to the neutral salt spray. FIG. 2E shows the bonded then separated test coupons after 20 weeks exposure to the neutral salt spray. Alloy reference A exhibited no significant effect from the neutral salt spray test.

Figures 3A, 3B, 3C, 3D, 3E:
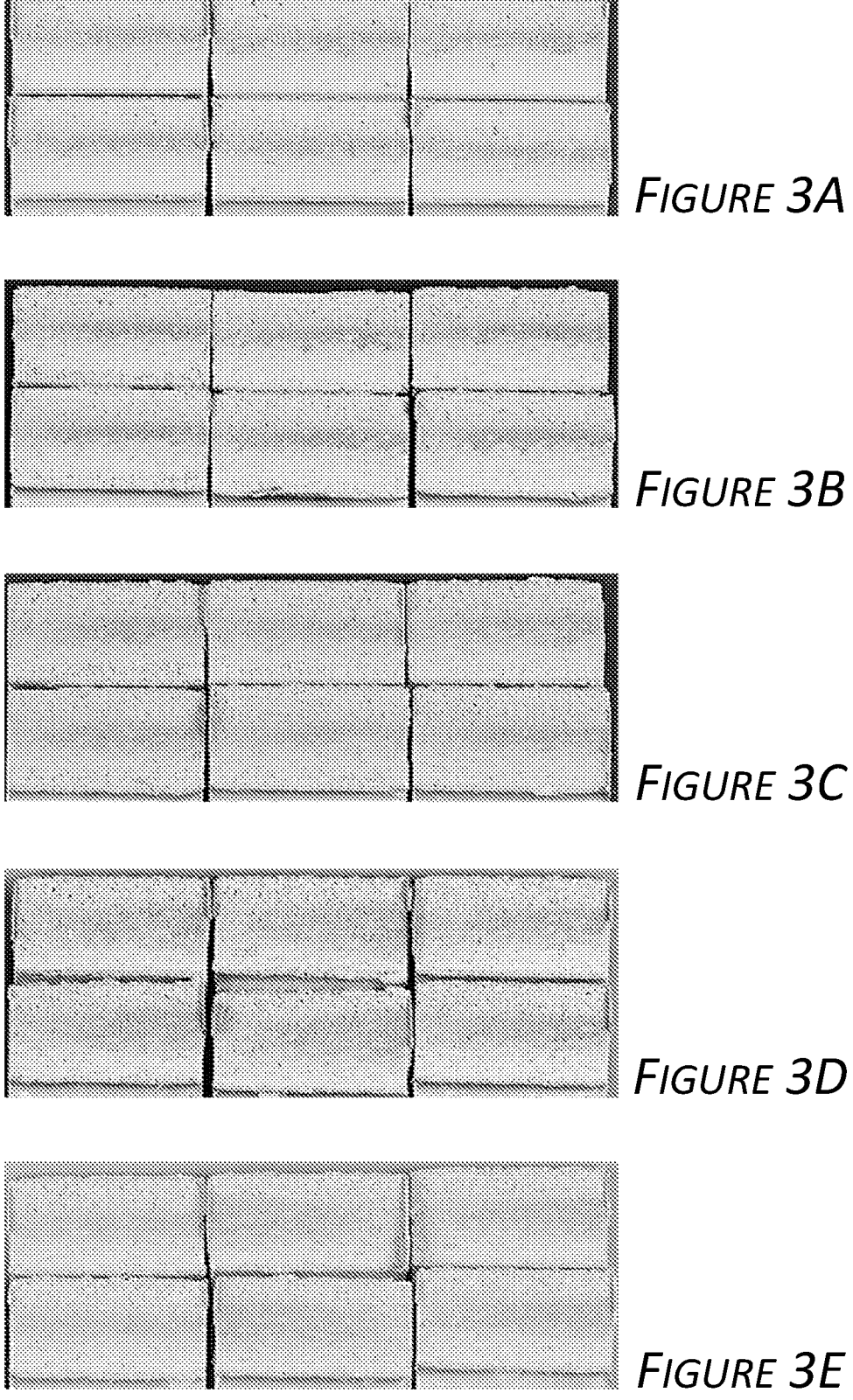
FIGS. 3A-3E are digital images of adhesive testing results for aluminum alloy samples containing excess Si and pretreated with a Si-containing compound at 0 weeks (FIG. 3A), 2 weeks (FIG. 3B), 6 weeks (FIG. 3C), 12 weeks (FIG. 3D), and 20 weeks (FIG. 3E).

FIGS. 3A-3E show the visible results after testing for Alloy reference B. FIG. 3A shows the bonded then separated test coupons after no exposure to the neutral salt spray. FIG. 3B shows the bonded then separated test coupons after 2 weeks exposure to the neutral salt spray. FIG. 3C shows the bonded then separated test coupons after 6 weeks exposure to the neutral salt spray. FIG. 3D shows the bonded then separated test coupons after 12 weeks exposure to the neutral salt spray. FIG. 3E shows the bonded then separated test coupons after 20 weeks exposure to the neutral salt spray. Alloy reference B exhibited no significant effect from the neutral salt spray test.

Figure 4A:
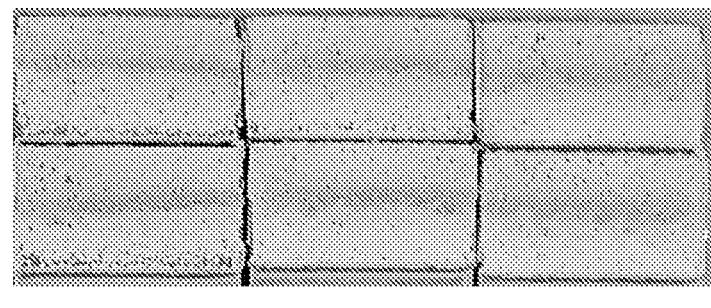
FIGS. 4A-4D are digital images of adhesive testing results for aluminum alloy samples containing excess Si and pretreated with a titanium zirconium (TiZr) pretreatment at 0 weeks (FIG. 4A), 6 weeks (FIG. 4B), 12 weeks (FIG. 4C), and 20 weeks (FIG. 4D).
Figure 4B:
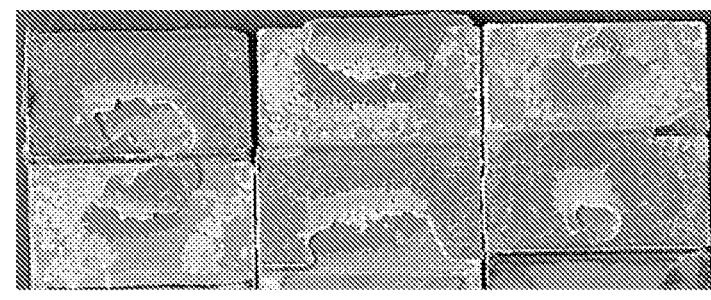
Figure 4C:
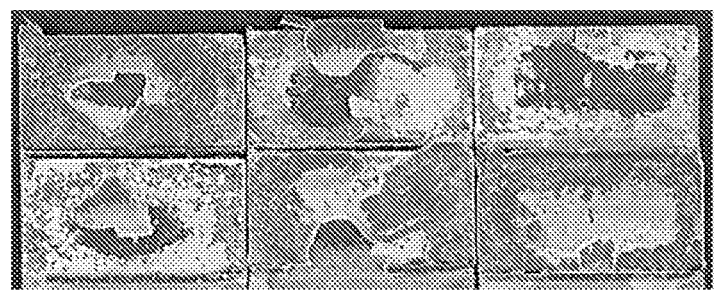
Figure 4D:
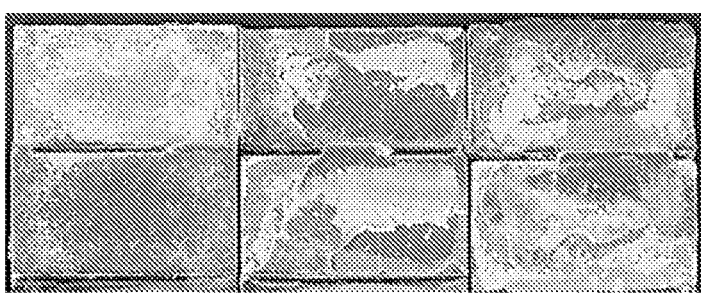

FIGS. 4A-4D show the visible results after testing for Alloy reference C. FIG. 4A shows the bonded then separated test coupons after no exposure to the neutral salt spray. FIG. 4B shows the bonded then separated test coupons after 6 weeks exposure to the neutral salt spray. FIG. 4C shows the bonded then separated test coupons after 12 weeks exposure to the neutral salt spray. FIG. 4D shows the bonded then separated test coupons after 20 weeks exposure to the neutral salt spray. Alloy reference C exhibited significant adhesive failure (e.g., failure at the interface of the adhesive and the metal) from the neutral salt spray test.

Figure 5A:
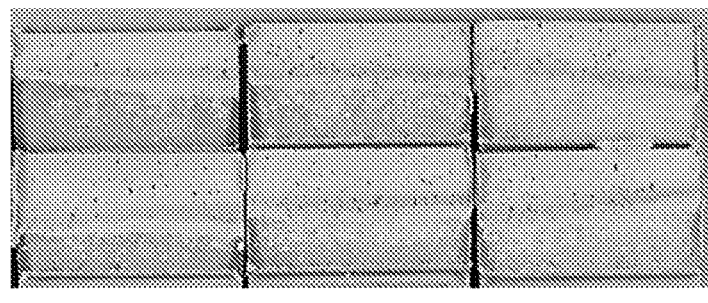
FIGS. 5A-5D are digital images of adhesive testing results for aluminum alloy samples containing excess Si and pretreated with a titanium zirconium (TiZr) pretreatment at 0 weeks (FIG. 5A), 6 weeks (FIG. 5B), 12 weeks (FIG. 5C), and 20 weeks (FIG. 5D).
Figure 5B:
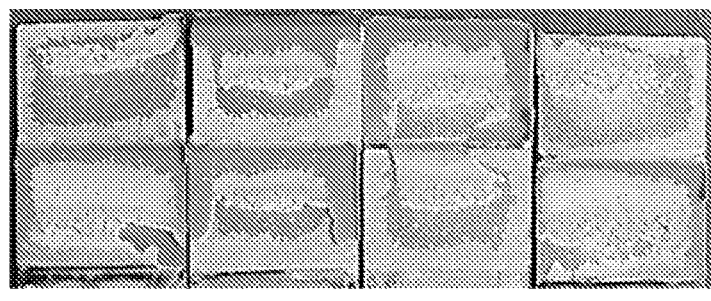
Figure 5C:
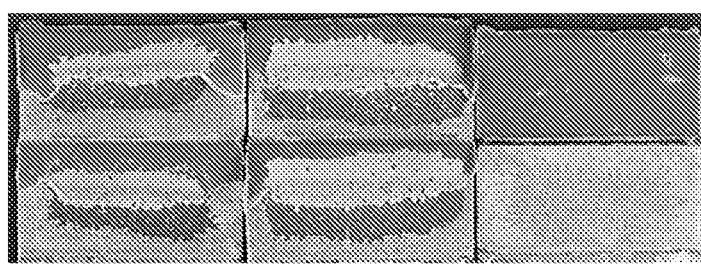
Figure 5D:
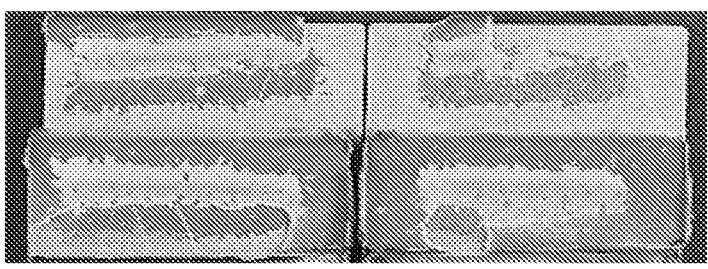

FIGS. 5A-5D show the visible results after testing for Alloy reference D. FIG. 5A shows the bonded then separated test coupons after no exposure to the neutral salt spray. FIG. 5B shows the bonded then separated test coupons after 6 weeks exposure to the neutral salt spray. FIG. 5C shows the bonded then separated test coupons after 12 weeks exposure to the neutral salt spray. FIG. 5D shows the bonded then separated test coupons after 20 weeks exposure to the neutral salt spray. Alloy reference D exhibited significant adhesive failure (e.g., failure at the interface of the adhesive and the metal) from the neutral salt spray test. Thus, employing a coating that corresponds to a predominant alloying element in the metal can provide increase bond strength and increased bond durability.

As shown in FIGS. 2-5, applying a Si-containing pretreatment to a metal having excess Si (e.g., FIGS. 2 and 3, Alloys reference A and B, respectively) provided superior bonding of the pretreatment to the metal surface. The superior bonding is shown by the cohesive failure shown in FIGS. 2 and 3. Cohesive failure is a failure within the bulk of the adhesive, indicating the bond of the adhesive to the metal is stronger than any internal bonding within the adhesive. Adhesive failure, as described above, is shown in FIGS. 4B-D and 5B-D, indicating the bond of the adhesive to the metal deteriorated during the neutral salt spray test. Thus, applying a Si-containing pretreatment to a metal having excess Si provided superior bond durability compared to applying a TiZr pretreatment to a metal having excess Si.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A pretreated aluminum alloy article comprising an aluminum alloy:

a first surface portion of the aluminum alloy comprising excess Si, wherein the excess Si is present in the first surface portion of the aluminum alloy in an amount greater than 1.4 wt. %, wherein excess Si content is calculated by subtracting from total Si content the Si needed for $Mg_2Si$, which is $Mg/1.72$, and for an Fe-containing phase, which is $Fe/3$; and a surface pretreatment layer consisting essentially of one or more Si-containing compounds, wherein either one of the first surface portion of the aluminum alloy or the one or more Si-containing compounds comprises O, wherein Si-O-Si bonding interactions exist between the excess Si present in the first surface portion of the aluminum alloy and the one or more Si-containing compounds present in the surface pretreatment layer, and wherein the surface pretreatment layer is adhered to the aluminum alloy.

2. The pretreated aluminum alloy article of claim 1, wherein the aluminum alloy comprises a 4xxx series aluminum alloy, a 5xxx series aluminum alloy, or a 6xxx series aluminum alloy.

3. The pretreated aluminum alloy article of claim 1, wherein the pretreated metal article is an automotive structural part, an aerospace structural part, a transportation structural part, an automotive body part, an aerospace skin panel, a transportation body part, an architectural part, an aesthetic part, an electronics device housing, or a beverage or food container.

\* \* \* \* \*